May 27, 1924.
A. W. RYBECK
SHAFT COUPLING
Filed May 10, 1922
1,495,207
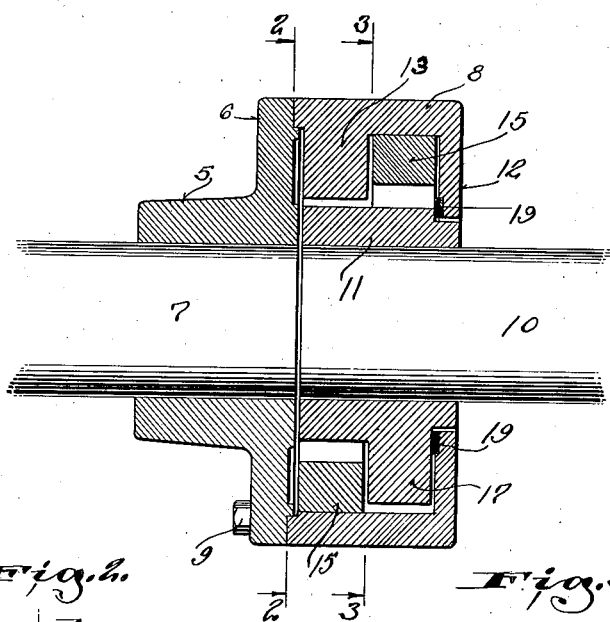
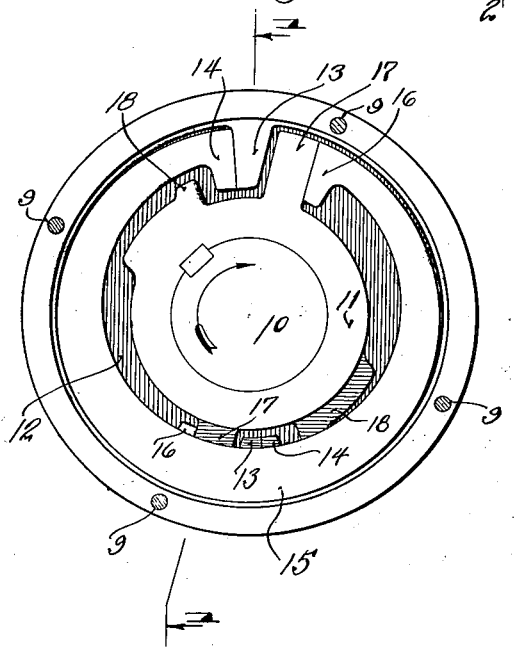
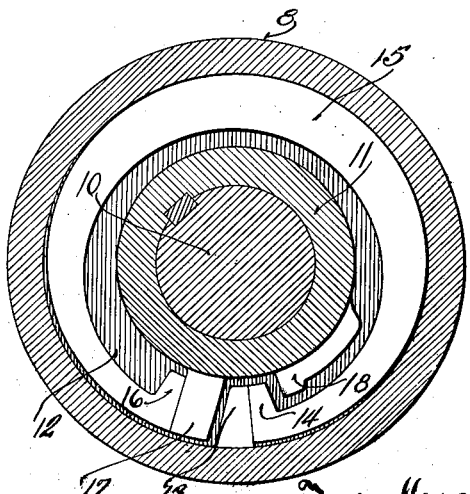
Inventor,
Adolph W. Rybeck
By Ira M. Jones.
Attorney Patented May 27, 1924.

1,495,207

UNITED STATES PATENT OFFICE.

ADOLPH W. RYBECK, OF MILWAUKEE, WISCONSIN.

SHAFT COUPLING.

Application filed May 10, 1922. Serial No. 559,817.

*To all whom it may concern:*

Be it known that I, ADOLPH W. RYBECK, a subject of the King of Sweden, and resident of Milwaukee, in the county of Milwaukee and State of Wisconsin, have invented new and useful Improvements in Shaft Couplings, of which the following is a description, reference being had to the accompanying drawing, which is a part of this specification.

This invention relates to certain new and useful improvements in a shaft coupling, and refers more particularly to a coupling for flexibly connecting shafts so as to accommodate any disalignment therebetween.

Numerous types of flexible couplings have been designed tending to provide a drive connection between two shafts and take care of any offset, end play, or angular alignment therebetween. However, in order to insure the necessary strength, it has been necessary to construct them in such sizes as to be cumbersome thus failing to afford the required flexibility.

It is, therefore, an object of this invention to provide a coupling which is so designed and constructed as to afford perfect flexibility, accommodate offset, end play or angular alignment, and which will be comparatively light in construction and at the same time be of sufficient strength.

Another objection to the various types of flexible couplings now on the market is the inability to properly lubricate the same and this invention has for another of its objects to provide a flexible coupling designed and constructed to permit thorough lubrication of all moving parts.

This invention has for a further object to provide a factor of safety against breaking of the spring or resilient member under overload, whereby the drive between the shafts becomes direct upon the torque or stress therebetween exceeding a predetermined degree.

A still further object of this invention resides in the provision of a flexible coupling having one or more resilient members or springs confined within a suitable housing and having one end engaged with a projection carried by one shaft and its other end engaged with a projection carried by the other shaft, the projections being movable in opposite directions upon application of stress to expand the spring, and means operable upon the stress between the two shafts exceeding a predetermined degree to directly connect the shafts and eliminate the possibility of breaking of the spring or springs.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a sectional view taken through Figure 2 on the plane of line 1—1 and illustrating a coupling constructed in accordance with my invention;

Figure 2 is a view taken transversely through the center of the couplings on the plane of the line 2—2 of Figure 1, and Figure 3 is a view, partly in elevation and partly in transverse section, taken through Figure 1 on the plane of line 3—3.

Referring now more particularly to the accompanying drawing, in which like numerals designate like parts throughout the several views, the numeral 5 designates the hub of an annular flange plate 6 which is splined or otherwise secured to a shaft 7 and has a housing 8 secured thereto by fastenings 9. Housing 8 extends over and encloses the adjacent end of a shaft 10 abutting shaft 7 and which carries a collar 11 confined within casing 8, between flange 6 and an inwardly extended flange 12 formed on the casing.

Projected inwardly from the inner peripheral wall of casing 8 is an inwardly extended lug or projection 13 with one side of which is engaged the end 14 of a split ring or spring 15, the other end 16 of which engages a projection or lug 17 formed on collar 11. Spring 15 normally yieldably urges projections 13 and 17 toward each other and to provide sufficient strength, is of substantially eccentric shape, i. e., with its intermediate portion enlarged.

A rotation of shaft 10 in the direction of the arrow in Figure 2 causes a tendency on the part of lugs 13 and 17 to separate against the force of spring 15 and the greater the stress between the shafts, the greater the distance between the lugs. In the event of an overload on the coupling, damage is prevented by means of a shoulder or hump 18 formed on collar 11 spaced from the side of projection 13 remote from projection 17 so that when the stress on spring 15 reaches a predetermined degree, the inwardly struck end 14 thereof engages shoulder 18 and the drive between the two shafts is then direct from shaft 10 to shaft 7, as will be readily apparent.

The coupling may be constructed for use with any desired maximum amount of load and either one or more springs 15 may be employed, the embodiment illustrated in the drawing depicting the use of two springs. When more than one spring 15 is employed, the lugs 13 and 17, and shoulder 18 of one spring, are so positioned with relation to the other as to insure proper balance to the coupling.

The interior of the casing 8 may be entirely filled with grease or other lubricant and, as a safeguard against leakage of the lubricant, a gasket or suitable packing 19 is carried by the inner periphery of flange 12 and engages the adjacent portion of collar 11.

What I claim as my invention is:

1. A coupling between two shafts, comprising a housing fixed to one shaft and extending over the adjacent end of the other shaft, a split, resilient ring in the housing having one end connected with the housing and its other end connected with the other shaft, whereby stress between the shafts is yieldingly resisted, and cooperating means carried by the housing and resilient ring for directly connecting the shafts upon the stress between the shafts exceeding a predetermined degree.

2. A coupling between two shafts, comprising a housing fixed to one shaft and extending over the adjacent end of the other shaft, a projection carried by the housing, a projection carried by the other shaft, a split, resilient ring in the housing having one end engaging the housing carried projection and its other end engaging the other shaft, carried projection, whereby the shafts are flexibly connected, and a projection rigid with one shaft and engageable with one end of the split ring upon movement apart of the ring ends a predetermined distance to provide a direct drive connection between the shafts.

3. A coupling between two shafts, comprising a housing fixed to one shaft and extending over the adjacent end of the other shaft, a projection carried by the housing, a projection carried by the other shaft, a split, resilient ring having one end engaged with the housing carried projection and its other end engaged with the other shaft, carried projection, whereby the shafts are flexibly connected, and a stop engageable with one projection and the ring end engaged therewith upon stress between the shafts exceeding a predetermined degree.

4. A coupling between two shafts, comprising a housing fixed to one shaft and extending over the adjacent end of the other shaft, a collar fixed to the other shaft and enclosed within the housing, an inwardly projected lug carried by the housing, a projection carried by the collar and extended outwardly therefrom in the path of the housing lug, and a split, resilient ring within the housing having one end engaging the housing lug and its other end engaging the collar projection to yieldingly resist opposite movement of the lug and projection.

5. A coupling between two shafts, comprising a housing fixed to one shaft and extending over the adjacent end of the other shaft, a collar fixed to the other shaft and enclosed within the housing, an inwardly projected lug carried by the housing, a projection carried by the collar and extended outwardly therefrom in the path of the housing lug, a split, resilient ring within the housing having one end engaging the housing lug and its other end engaging the collar projection to yieldingly resist opposite movement of the lug and projection, and means engageable with the housing carried lug to limit the spreading apart of the split ring.

6. A coupling between two shafts, comprising a housing fixed to one shaft and extending over the adjacent end of the other shaft, a collar fixed to the other shaft and enclosed within the housing, an inwardly projected lug carried by the housing, a projection carried by the collar and extended outwardly therefrom in the path of the housing lug, a split, resilient ring within the housing having one end engaging the housing lug and its other end engaging the collar projection to yieldingly resist opposite movement of the lug and projection, a second lug carried by the housing, a second projection carried by the collar, and a second split, resilient ring within the housing having one end engaging the second housing carried lug and its other end engaging the second collar carried projection to, with the first named split ring, yieldingly resist opposite movement of the lugs and projections.

7. A coupling between two shafts, comprising a housing fixed to one shaft, a pair of split resilient ring members in the housing and disposed with their split portions substantially diametrically opposed, a pair of diametrically opposed projections carried by the housing and engageable with the adjacent ends of the split rings, and a pair of diametrically opposed projections connected with the other shaft and engageable with the other ends of the split rings, whereby stress between the shafts during rotation is yieldably resisted.

8. A coupling between two shafts, comprising a housing fixed to one shaft, a pair of split resilient ring members in the housing and disposed with their split portions substantially diametrically opposed, a pair of diametrically opposed projections carried by the housing and engageable with the adjacent ends of the split rings, a pair of diametrically opposed projections connected with the other shaft and engageable with the other ends of the split rings, whereby stress between the shafts during rotation in one direction is yieldably resisted, and diametrically opposed stop members carried by the second shaft and engageable with the housing carried projections upon movement apart of the adjacent pairs of projections a predetermined distance to directly connect said shafts.

9. A coupling between two shafts, comprising a housing fixed to one shaft and extended over the adjacent end of the other shaft, a collar member carried by the end of said other shaft and disposed within said housing, a split resilient ring in said housing, a projection carried by said housing and engageable against one end of said split ring, a projection carried by said collar and engageable against the other end of said split ring whereby tendency upon the shafts to rotate in opposite directions to move said projections apart is yieldably resisted, and a stop carried by said collar and disposed on the side of said housing carried projection opposite the collar carried projection whereby movement apart of said projections a predetermined distance engages said stop with the housing carried projection to provide a direct drive between the shafts.

In testimony whereof I affix my signature.

ADOLPH W. RYBECK.